United States Patent
Wang et al.

(10) Patent No.: US 7,305,301 B1
(45) Date of Patent: Dec. 4, 2007

(54) ENGINE PRE-THROTTLE PRESSURE ESTIMATION

(75) Inventors: Wenbo Wang, Novi, MI (US); Michael A. Kropinski, Troy, MI (US); Kurt D. McLain, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/464,340

(22) Filed: Aug. 14, 2006

(51) Int. Cl.
*G06F 19/00* (2006.01)
*F02D 41/00* (2006.01)

(52) U.S. Cl. .................. 701/114; 73/118.2; 123/361

(58) Field of Classification Search ............... 701/114, 701/102; 123/399, 361; 73/118.2
See application file for complete search history.

(56) References Cited

U.S. PATENT DOCUMENTS

| | | | |
|---|---|---|---|
| 6,895,946 B1 * | 5/2005 | Livshiz et al. | 123/434 |
| 6,968,824 B1 * | 11/2005 | Matthews et al. | 73/118.2 |
| 7,021,282 B1 * | 4/2006 | Livshiz et al. | 123/350 |

* cited by examiner

*Primary Examiner*—Hieu T. Vo

(57) ABSTRACT

An engine control system for regulating operation of an engine having a throttle includes a first module that determines an intermediate parameter based on engine operating parameters and a second module that determines a pressure upstream of the throttle based on the intermediate parameter. A third module regulates operation of the engine based on the pressure. The engine operation is regulated based on a pre-determined relationship between a throttle position and an effective throttle area.

21 Claims, 5 Drawing Sheets

ENGINE PRE-THROTTLE PRESSURE ESTIMATION

FIELD

The present disclosure relates to internal combustion engines and more particularly to estimating the air pressure upstream of the throttle of an internal combustion engine.

BACKGROUND

The statements in this section merely provide background information related to the present disclosure and may not constitute prior art.

Internal combustion engines combust a fuel and air mixture to produce drive torque. More specifically, air is drawn into the engine through a throttle. The air is mixed with fuel and the air and fuel mixture is compressed within a cylinder using a piston. The air and fuel mixture is combusted within the cylinder to reciprocally drive the piston within the cylinder, which in turn rotationally drives a crankshaft of the engine.

Engine operation is regulated based on several parameters including: but not limited to, intake air temperature ($T_{PRE}$), manifold absolute pressure (MAP), throttle position (TPS) and engine RPM. With specific reference to the throttle: the state parameters (e.g., air temperature and pressure) before the throttle are good references that can be used for engine control and diagnostic. For example, proper functioning of the throttle can be monitored by calculating the flow through the throttle for a given throttle position and then comparing the calculated air flow to a measured or actual air flow. As a result, the total or stagnation air pressure before the throttle (i.e., the pre-throttle air pressure) is critical to accurately calculate the flow through the throttle, Alternatively, the total pressure and/or static pressure can be used to monitor air filter restriction.

Traditional internal combustion engines include a pre-throttle pressure sensor that directly measures the pre-throttle pressure. However, such additional hardware increases cost and manufacturing time, and is also a maintenance concern because proper operation of the sensor must be monitored and the sensor must be replaced if not functioning properly.

SUMMARY

Accordingly, the present invention provides an engine control system for regulating operation of an engine having a throttle. The engine control system includes a first module that determines an intermediate parameter based on engine operating parameters and a second module that determines a pressure upstream of the throttle based on the intermediate parameter. A third module regulates operation of the engine based on the pressure. The engine operation is regulated based on a pre-determined relationship between a throttle position and an effective throttle area.

In one feature, the engine control system further includes a fourth module that compares the intermediate parameter to a threshold value. The second module determines the pressure based on the comparison.

In other features, the engine control system further includes a fourth module that determines a pressure ratio based on the intermediate parameter. The fourth module sets the pressure ratio equal to a constant value if the intermediate parameter is not less than a threshold value, Alternatively, the fourth module determines the pressure ratio based on the intermediate parameter if the intermediate parameter is not less than a threshold value.

In still another feature, the engine control system further includes a fourth module that determines a pressure ratio based on the intermediate parameter and a fifth module that determines a stagnation pressure based on the pressure ratio.

In yet another feature, the third module determines whether a component of the engine is functioning properly based on said pressure.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
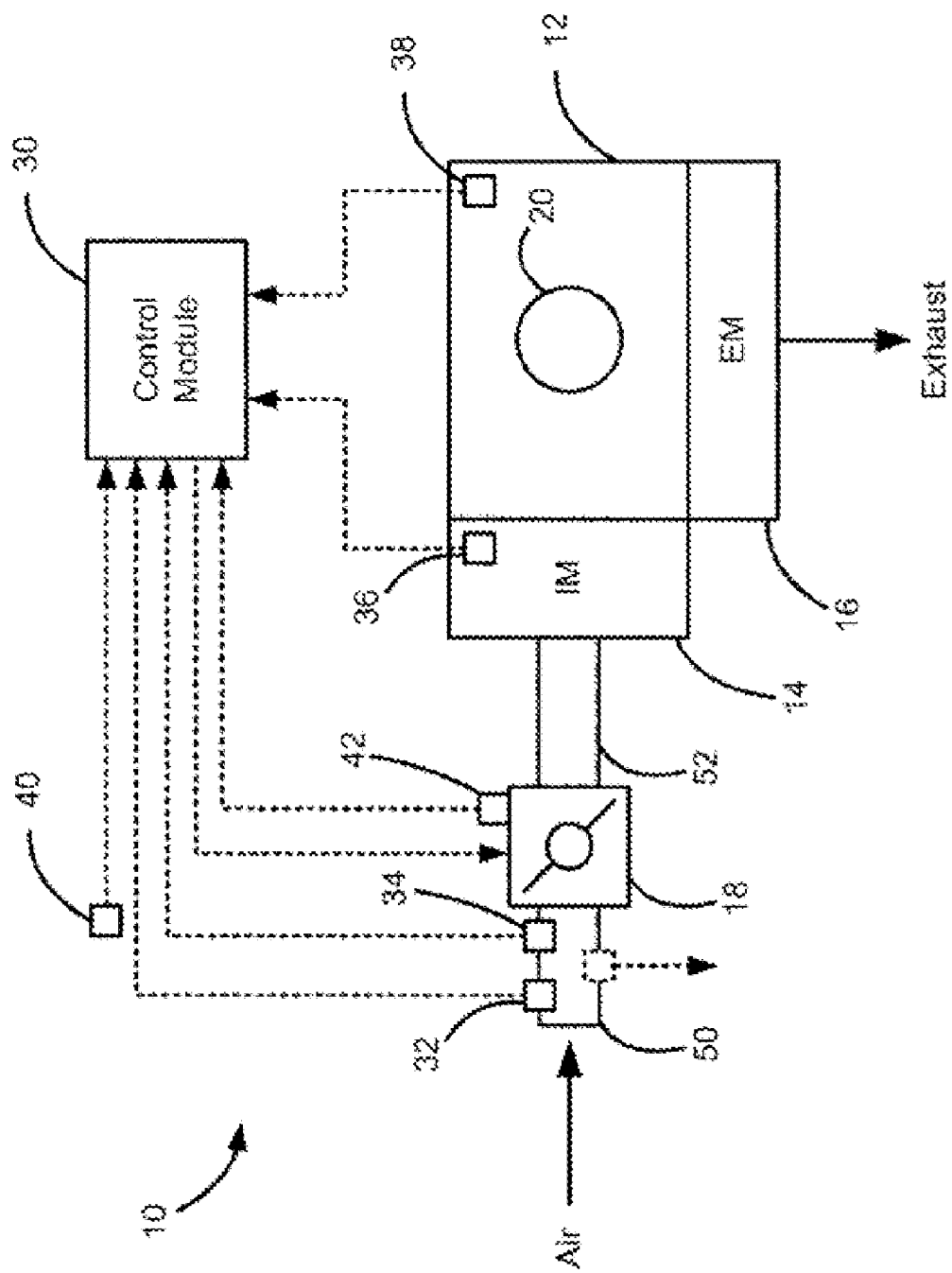
FIG. 1 is a functional block diagram of an internal combustion engine system that is regulated in accordance with the pre-throttle pressure estimation control of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1 an exemplary internal combustion engine system 10 is illustrated. The engine system 10 includes an engine 12, an intake manifold 14 and an exhaust manifold 16. Air is drawn into the intake manifold 14 through a throttle 18. The air is mixed with fuel, and the fuel and air mixture is combusted within a cylinder 20 of the engine 12. More specifically, the fuel and air mixture is compressed within the cylinder 20 by a piston (not shown) and combustion is initiated. The combustion process releases energy that is used to reciprocally drive the piston within the cylinder 20. Exhaust that is generated by the combustion process is exhausted through the exhaust manifold 16 and is treated in an exhaust after-treatment system (not shown) before being released to atmosphere. Although a single cylinder 20 is illustrated, it is anticipated that the pre-throttle estimation control of the present invention can be implemented with engines having more than one cylinder.

A control module 30 regulates engine operation based on a plurality of engine operating parameters including, but not limited to, a pre-throttle static pressure ($P_{PRE}$), a pre-throttle stagnation pressure ($P_{PRE0}$) (i.e., the air pressures upstream of the throttle), an intake air temperature ($T_{PRE}$), a mass air flow (MAF), a manifold absolute pressure (MAP), an effective throttle area ($A_{EFF}$) and an engine RPM. $P_{PRE0}$ and $P_{PRE}$ are determined based on the pre-throttle estimation control of the present invention, as explained in further detail below. $T_{PRE}$, MAF, MAP and engine RPM are determined based on signals generated by a $T_{PRE}$ sensor 32, a MAF sensor 34, a MAP sensor 36 and an engine RPM sensor 38, respectively, which are all standard sensors of an engine system. $A_{EFF}$ is determined based on a throttle position signal that is generated by a throttle position sensor, which is also a standard sensor. A barometric pressure ($P_{BARO}$) is monitored using a barometric pressure sensor 40. A throttle position sensor 42 generates a throttle position signal (TPS). The relationship between $A_{EFF}$ to TPS is pre-determined using engine dynamometer testing with a temporary stagnation pressure sensor (shown in phantom in FIG. 1) installed. Production vehicles include the relationship pre-programmed therein and therefore do not require the continued presence of the pressure sensor.

The pre-throttle pressure estimation control of the present invention determines $P_{PRE}$ and $P_{PRE0}$ based on engine operating parameters including, but not limited to MAF, $A_{EFF}$, $T_{PRE}$ and MAP. More specifically, the throttle 18 and the associated pre and post air passages 50, 52, respectively, are provided as a control volume and the air flow therethrough is treated as a one-dimensional, quasi-steady state compressible gas flow. Accordingly, the following relationship is provided:

$$MAF = A_{EFF} \cdot \Phi \cdot \frac{P_{PRE0}}{\sqrt{R \cdot T_{PRE0}}} \quad (1)$$

where $P_{PRE0}$ is the pre-throttle stagnation pressure (i.e., the pressure that the air would reach if it were brought to zero speed, via a steady, adiabatic, quasi-static process with no external work) measured in kPa, $T_{PRE0}$ is the pre-throttle stagnation temperature (i.e., the temperature that the fluid would reach if it were brought to zero speed by a steady, adiabatic process with no external work) measured in K, R is the ideal gas constant for air (i.e., 288.17 Nm/(kg·K)). $\phi$ is a unit-less coefficient equal to 0.6847 for sonic air flow (i.e., where MAP/$P_{PRE0}$ is less than 0.528) and is determined based on the following relationship for sub-sonic air flow:

$$\Phi = \left[ \frac{2k}{k-1} \left( P_R^{\frac{2}{k}} - P_R^{\frac{k+1}{k}} \right) \right]^{1/2} \quad (2)$$

where k is the ratio of specific heats for air (i.e., 1.4) and $P_R$ is equal to the ratio of MAP to $P_{PRE0}$. $T_{PRE0}$ is determined based on the following relationship:

$$T_{PRE0} = T_{PRE} + \frac{k-1}{2 \cdot k \cdot R} V^2 \quad (3)$$

where V is the air velocity upstream of the throttle and is determined based on the MAF signal, ρ and the throttle intake pipe geometry. ρ is the air density (kg/m³) and can be assumed to be the same value as ambient air because the flow through air filter system has such a low Mach number (e.g., <<03) that it can be treated as incompressible air flow.

Equations 1 and 2 can be combined to provide the following relationship:

$$\Phi \cdot P_{PRE0} = \frac{MAF \cdot \sqrt{R \cdot T_{PRE0}}}{A_{EFF}} \quad (4)$$

Dividing both sides of Equation 4 by MAP provides:

$$\Phi \cdot \frac{P_{PRE0}}{MAP} = \frac{MAF \cdot \sqrt{R \cdot T_{PRE0}}}{MAP \cdot A_{EFF}} \quad (5)$$

which can be rewritten to provide:

$$\frac{\Phi}{P_R} = \frac{MAF \cdot \sqrt{R \cdot T_{PRE0}}}{MAP \cdot A_{EFF}} \quad (6)$$

An intermediate parameter ($\phi_{NEW}$) is defined based on Equation 6 to provide the following relationship:

$$\Phi_{NEW} = \frac{\Phi}{P_R} = \frac{MAF \cdot \sqrt{R \cdot T_{PRE0}}}{MAP \cdot A_{EFF}} \quad (7)$$

Accordingly, for sonic air flow (i.e., $P_R$<0.528), $\phi_{NEW}$ is provided as:

$$\Phi_{NEW} = \frac{0.6847}{0.528} = 1.2968$$

For sub-sonic air flow (i.e. $P_R \geq 0.528$), $\phi_{NEW}$ is provided as:

$$\Phi_{NEW} = \frac{\left[ \frac{2k}{k-1} \left( P_R^{\frac{2}{k}} - P_R^{\frac{k+1}{k}} \right) \right]^{1/2}}{P_R} \quad (8)$$

Figure 2:
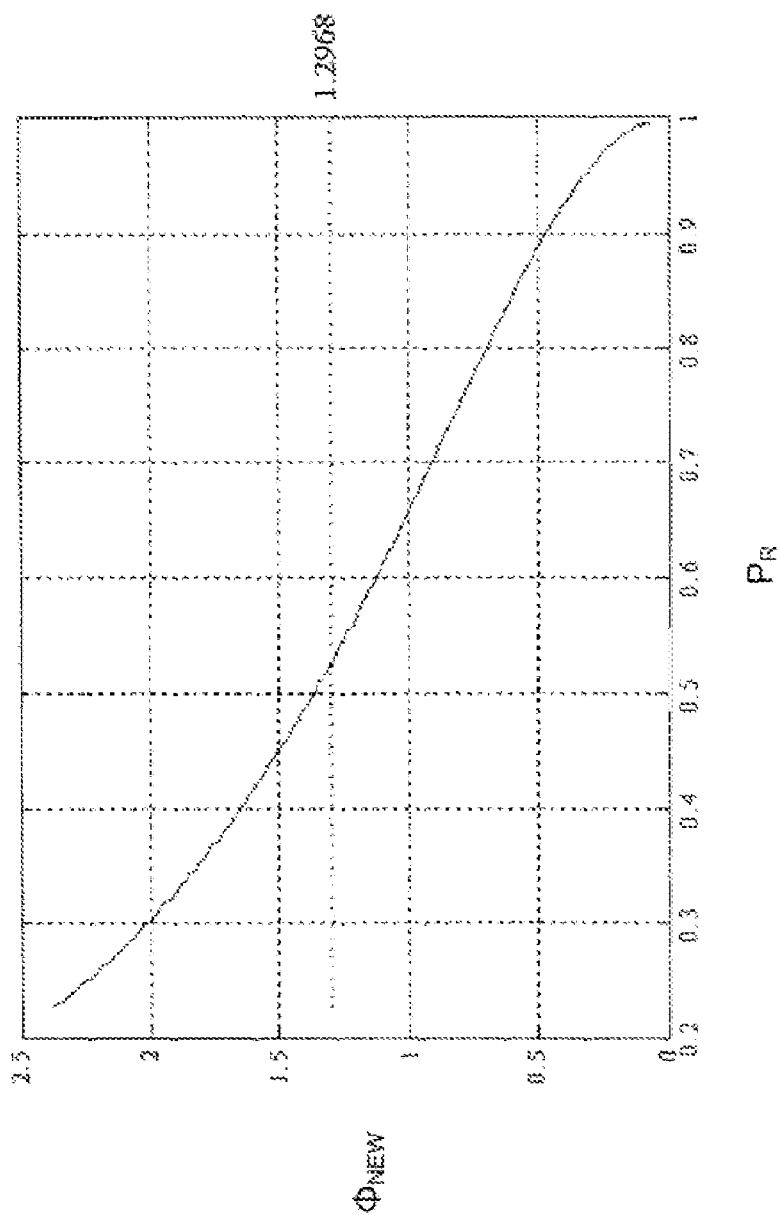
FIG. 2 is a graph that graphically illustrates an exemplary look-up table for determining a pressure ratio based on an intermediate value in accordance with the pre-throttle pressure estimation control of the present invention.

$P_{PRE0}$ is determined by first calculating $\phi_{NEW}$ based on MAF, R, $T_{PRE0}$, $A_{EFF}$ and MAP in accordance with Equation 7. If $\phi_{NEW}$ is greater than or equal to 1.2968 (i.e., sonic air flow) $\phi$ is clamped to 0.6847 and $P_{PRE0}$ is determined based on Equation 4. As provided above, $P_R$ is set equal to a constant (C) (e.g., 0.528) for sonic air flow. If $\phi_{NEW}$ is less than a threshold value ($X_{THR}$) 1.2968 (i.e., sub-sonic air flow), $P_R$ is calculated based on $\phi_{NEW}$. More specifically, $P_R$ can be calculated using Equation 8 or can be determined using a look-up table. An exemplary look-up table is graphically illustrated in FIG. 2.

$P_{PRE0}$ value can be determined by dividing MAP by $P_R$, and is used to control engine operation and/or for diagnostics. For example, during engine control, $P_{PRE0}$, MAF, MAP and $T_{PRE0}$ can be used to calculate the throttle position. If the air flow into the engine needs to change the change in throttle position can be predicted for the current air flow to the desired air flow. $P_{PRE0}$, along with other parameters, can be used to calculate a theoretical MAF, which is comparable to that determined by the MAF sensor. In this manner, it can be determined whether the MAF sensor and/or the throttle is/are functioning properly. As a result, throttle position error and/or MAF error can be diagnosed, depending on what other conditions are known.

The pre-throttle estimation control also provides the following relationship:

$$P_{PRE0} = P_{PRE} + \frac{\rho \cdot V^2}{2} \quad (9)$$

Accordingly, $P_{PRE}$ is determined based on $P_{PRE0}$ using Equation 9, $P_{PRE}$ can also be used to control engine operation and for diagnostics. For example, during engine control, $P_{PRE}$: MAF, $P_{BARO}$ and $T_{PRE0}$ can be used to calculate or monitor the air filter restriction conditions.

$P_{PRE0}$ can be measured directly during calibration of the engine operating parameters, for example, when calibrating $A_{EFF}$ versus throttle position. More specifically, calibrating $A_{EFF}$ versus throttle position, $P_{PRE0}$ is concurrently measured to correspond to the $A_{EFF}$ and throttle position values with other parameters such as $T_{PRE}$, MAF and MAP. In this manner, the $P_{PRE0}$ estimation provided by the present invention is accurate during post-calibration engine operation. Alternatively, $P_{PRE0}$ can be calculated from a measured $P_{PRE}$ and calculated air flow velocity using Equation 9.

Figure 3:
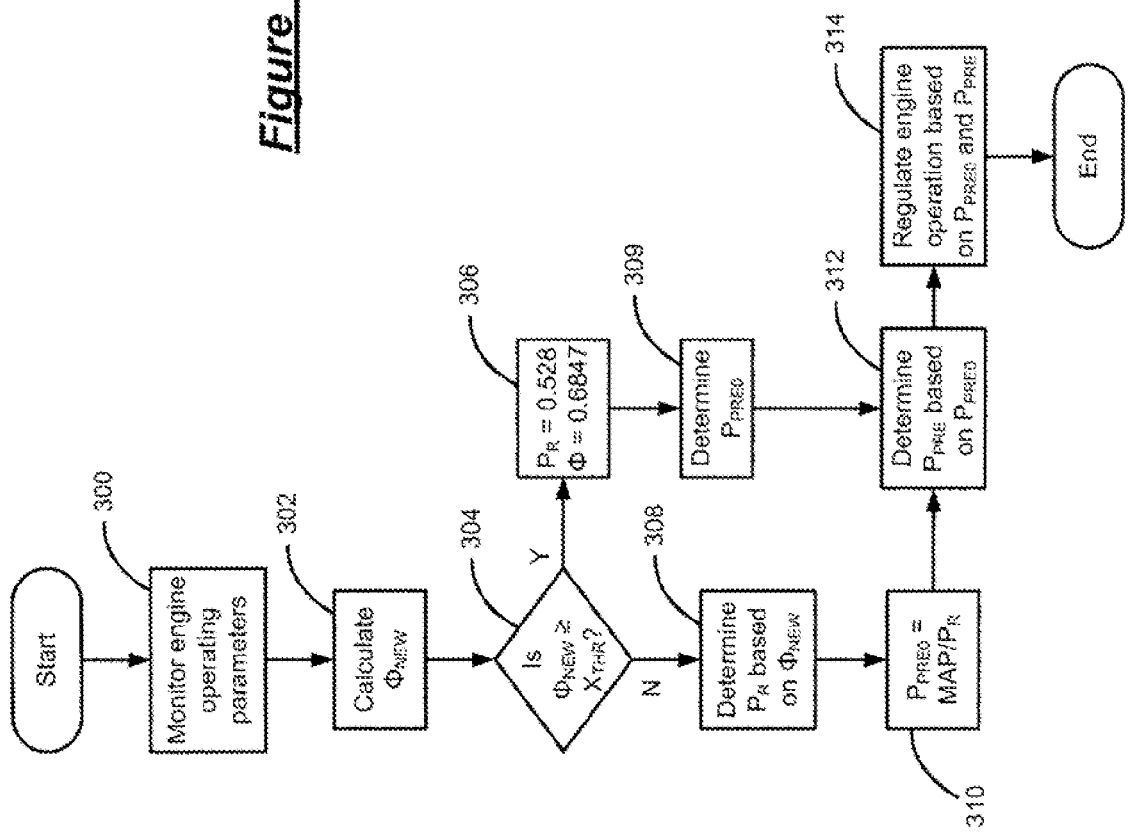
FIG. 3 is a flowchart illustrating exemplary steps that are executed by the pre-throttle estimation control of the present invention.

Referring now to FIG. 3, exemplary steps executed by the pre-throttle pressure estimation control will be described in detail. In step 300, control monitors the engine operating parameters including, but not limited to, MAF, $A_{EFF}$, $T_{PRE}$ and MAP. In step 302, control calculates $\phi_{NEW}$ based on the engine operating parameters as described in detail above. Control determines whether $\phi_{NEW}$ is greater than or equal to $X_{THR}$ (e.g., 1.2968) in step 304. If $\phi_{NEW}$ is greater than or equal to $X_{THR}$, control continues in step 306. If $\phi_{NEW}$ is not greater than or equal to $X_{THR}$, control continues in step 308.

In step 306, control sets $P_R$ equal to 0.528 and $\phi$ to 0.6847. Control determines $P_{PRE0}$ using Equation 4 in step 309 and control continues in step 312. In step 308, control determines $P_R$ based on $\phi_{NEW}$. In step 310, control determines $P_{PRE0}$ based on MAP and $P_R$ Control determines $P_{PRE}$ based on $P_{PRE0}$ in accordance with Equation 9 in step 312, as described in detail above. In step 314, control regulates engine operation based on $P_{PRE0}$ and $P_{PRE}$, and control ends.

Figure 4:
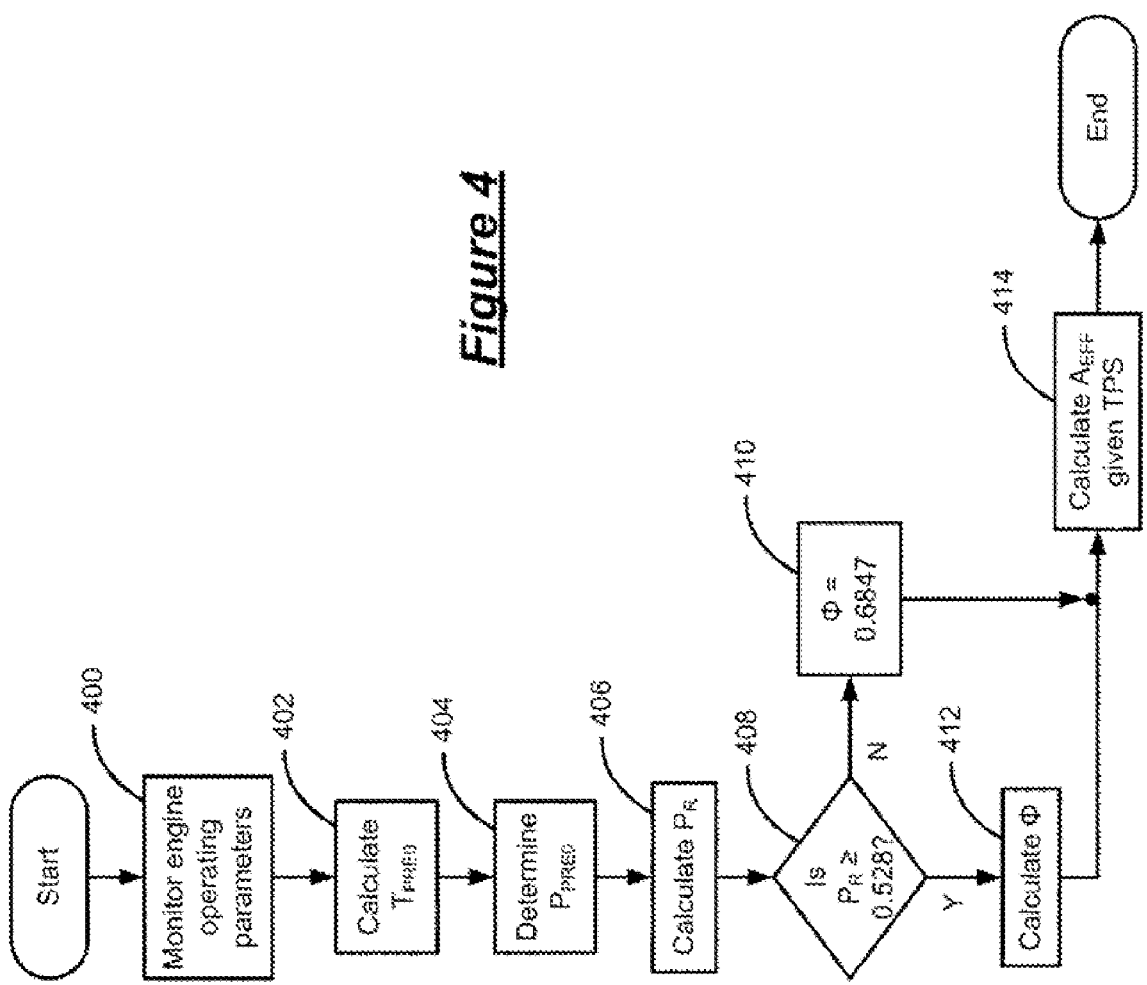
FIG. 4 is a flowchart illustrating exemplary steps that are executed to develop a relationship between throttle position and an effective throttle area.

Referring now to FIG. 4, exemplary steps that are executed to develop the relationship between $A_{EFF}$ and TPS will be described in detail. The relationship is determined during dynamometer engine testing. In step 400, control monitors the engine operating parameters including, but not limited to, MAF, MAP, $T_{PRE}$ and TPS. In step 402, control calculates $T_{PRE0}$. Control determines $P_{PRE0}$ in step 404. More specifically, $P_{PRE0}$ can be measured using the temporary pressure sensor or can be calculated based on measured $P_{PRE}$.

In step 406, control calculates $P_R$ as the ratio of MAP to $P_{PRE0}$. Control determines whether $P_R$ is greater than or equal to 0.528 in step 408. If $P_R$ is not greater than or equal to 0.528, control sets $\phi$ equal to 0.6847 in step 410 and continues in step 414. If $P_R$ is greater than or equal to 0.528, control calculates $\phi$ based on Equation 2 in step 412 and continues in step 414. In step 414 control calculates $A_{EFF}$ for the given TPS using Equation 1 and control ends.

Figure 5:
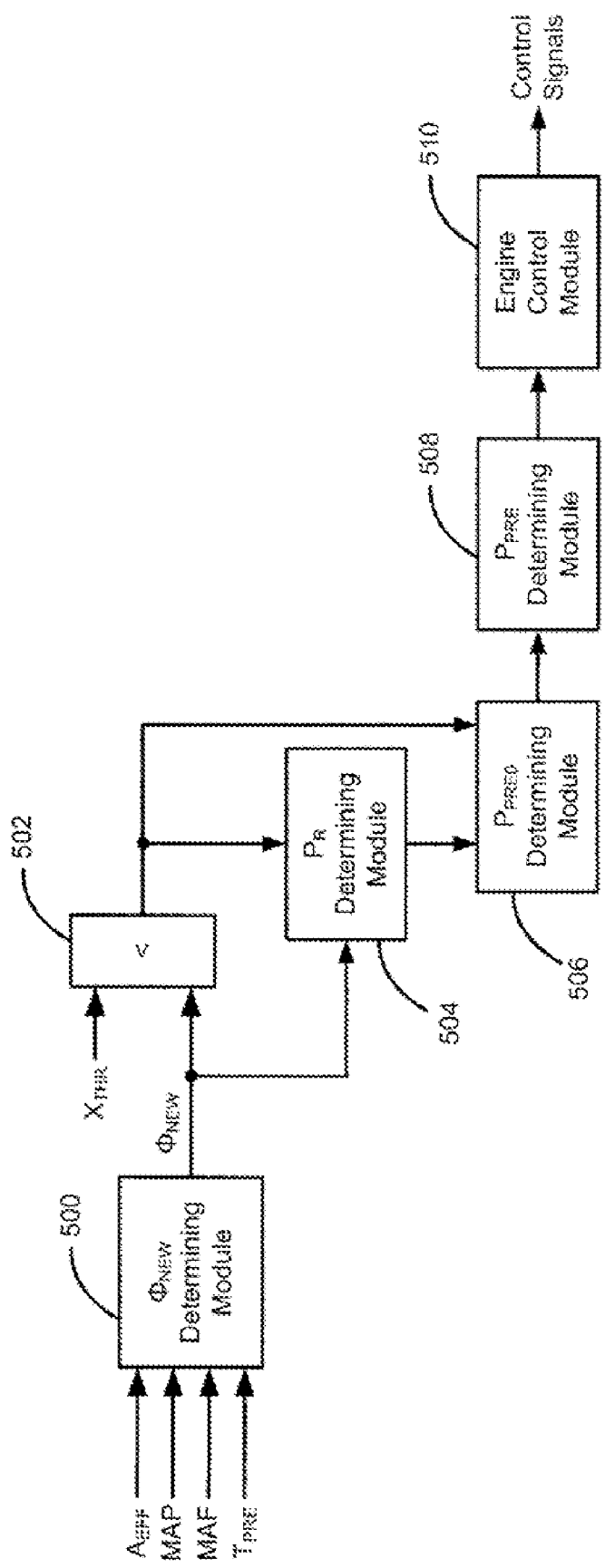
FIG. 5 is a functional block diagram illustrating exemplary modules that execute the pre-throttle pressure estimation control.

Referring now to FIG. 5, exemplary modules that execute the pre-throttle estimation control will be described in detail. The exemplary modules include a $\phi_{NEW}$ determining module 500, a comparator module 502, a $P_R$ determining module 504, a $P_{PRE0}$ determining module 506, a $P_{PRE}$ determining module 508 and an engine control module 510. The $\phi_{NEW}$ determining module 500 determines $\phi_{NEW}$ based on the engine operating parameters including, but not limited to, MAF, $A_{EFF}$, $T_{PRE}$ and MAP. The comparator module 502 compares $\phi_{NEW}$ to $X_{THR}$. If $\phi_{NEW}$ is less than $X_{THR}$, the comparator module 502 generates a first signal (e.g., 1). If $\phi_{NEW}$ is not less than $X_{THR}$, the comparator module 502 generates a second signal (e.g., 0).

The $P_R$ determining module 504 determines $P_R$ based on $\phi_{NEW}$ and the output signal of the comparator module 502. More specifically, if the output signal indicates that $\phi_{NEW}$ is not less than $X_{THR}$, the $P_R$ determining module 504 sets $P_R$ equal to 0.528. If the output signal indicates that $\phi_{NEW}$ is less than $X_{THR}$, the $P_R$ determining module 504 determines $P_R$ based on $\phi_{NEW}$. The $P_{PRE0}$ determining module 506 determines $P_{RRE0}$ based on $P_R$ and MAP if $\phi_{NEW}$ is less than $X_{THR}$, and based on Equation 4 if $\phi_{NEW}$ is not less than $X_{THR}$. The $P_{PRE}$ determining module 508 determines $P_{PRE}$ based on $P_{PRE0}$. The engine control module 510 generates control signals based on $P_{PRE0}$ and $P_{PRE}$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine control system for regulating operation of an engine having a throttle, comprising:
    a first module that determines an intermediate parameter based on engine operating parameters;
    a second module that determines a pressure upstream of said throttle based on said intermediate parameter; and
    a third module that regulates operation of said engine based on said pressure, wherein said operation is regulated based on a pre-determined relationship between a throttle position and an effective throttle area.

2. The engine control system of claim 1 further comprising a fourth module that compares said intermediate parameter to a threshold values wherein said second module determines said pressure based on said comparison.

3. The engine control system of claim 1 further comprising a fourth module that determines a pressure ratio based on said intermediate parameter.

4. The engine control system of claim 3 wherein said fourth module sets said pressure ratio equal to a constant value if said intermediate parameter is not less than a threshold value.

5. The engine control system of claim 3 wherein said fourth module determines said pressure ratio based on said intermediate parameter if said intermediate parameter is not less than a threshold value.

6. The engine control system of claim 1 further comprising:
   a fourth module that determines a pressure ratio based on said intermediate parameter; and
   a fifth module that determines a stagnation pressure based on said pressure ratio.

7. The engine control system of claim 1 wherein said third module determines whether a component of said engine is functioning properly based on said pressure.

8. A method of regulating operation of an engine having a throttle, comprising:
   determining an intermediate parameter based on engine operating parameters;
   determining a pressure upstream of said throttle based on said intermediate parameter; and
   regulating operation of said engine based on said pressure, wherein said operation is regulated based on a pre-determined relationship between a throttle position and an effective throttle area.

9. The method of claim 8 further comprising comparing said intermediate parameter to a threshold value, wherein said pressure is determined based said comparison.

10. The method of claim 8 further comprising determining a pressure ratio based on said intermediate parameter.

11. The method of claim 10 further comprising setting said pressure ratio equal to a constant value if said intermediate parameter is not less than a threshold value.

12. The method of claim 10 further comprising determining said pressure ratio based on said intermediate parameter if said intermediate parameter is not less than a threshold value.

13. The method of claim 8 further comprising:
   determining a pressure ratio based on said intermediate parameter; and
   determining a stagnation pressure based on said pressure ratio.

14. The method of claim 8 further comprising determining whether a component of said engine is functioning properly based on said pressure.

15. A method of regulating operation of an engine having a throttle, comprising:
   determining an intermediate parameter based on engine operating parameters;
   determining a pressure upstream of said throttle based on said intermediate parameter;
   regulating operation of said engine based on said pressure wherein said operation is regulated based on a pre-determined relationship between a throttle position and an effective throttle area; and
   diagnosing proper operation of one of said throttle and an engine sensor based on said pressure.

16. The method of claim 15 wherein said engine sensor includes a mass air flow sensor.

17. The method of claim 15 further comprising comparing said intermediate parameter to a threshold value, wherein said pressure is determined based said comparison.

18. The method of claim 15 further comprising determining a pressure ratio based on said intermediate parameter.

19. The method of claim 18 further comprising setting said pressure ratio equal to a constant value if said intermediate parameter is not less than a threshold value.

20. The method of claim 18 further comprising determining said pressure ratio based on said intermediate parameter if said intermediate parameter is not less than a threshold value.

21. The method of claim 15 further comprising:
   determining a pressure ratio based on said intermediate parameter; and
   determining a stagnation pressure based on said pressure ratio.

* * * * *